United States Patent
Dudon et al.

(10) Patent No.: US 9,664,201 B2
(45) Date of Patent: May 30, 2017

(54) METHOD OF MAKING PROTECTIVE REINFORCEMENT FOR THE LEADING EDGE OF A BLADE

(75) Inventors: Laurent Paul Dudon, Viry-Chatillon (FR); Antonio Cremildo Arantes, Saint Michel sur Orge (FR)

(73) Assignee: SNECMA, Paris (FR)

( * ) Notice: Subject to any disclaimer, the term of this patent is extended or adjusted under 35 U.S.C. 154(b) by 550 days.

(21) Appl. No.: 14/237,995

(22) PCT Filed: Aug. 9, 2012

(86) PCT No.: PCT/FR2012/051878
§ 371 (c)(1),
(2), (4) Date: Feb. 10, 2014

(87) PCT Pub. No.: WO2013/021141
PCT Pub. Date: Feb. 14, 2013

(65) Prior Publication Data
US 2014/0193271 A1    Jul. 10, 2014

(30) Foreign Application Priority Data
Aug. 10, 2011    (FR) ...................................... 11 57278

(51) Int. Cl.
*F04D 29/38*    (2006.01)
*B23P 15/04*    (2006.01)
(Continued)

(52) U.S. Cl.
CPC .............. *F04D 29/38* (2013.01); *B23P 15/04* (2013.01); *B64C 11/205* (2013.01); *C23C 4/01* (2016.01);
(Continued)

(58) Field of Classification Search
CPC .......... B23P 15/04; B64C 11/205; C23C 4/01; C23C 4/02; C23C 4/067; C23C 4/08;
(Continued)

(56) References Cited

U.S. PATENT DOCUMENTS 1,255,650 A  *  2/1918  Samuelson  ........... F04D 29/666
                                                    415/168.1
4,006,999 A       2/1977  Brantley et al.
(Continued)

FOREIGN PATENT DOCUMENTS

EP    1 217 089 A2   6/2002
EP    1 577 422 A1   9/2005
(Continued)

OTHER PUBLICATIONS

International Search Report issued Nov. 16, 2012, in PCT/FR12/051878 filed Aug. 9, 2012.
Office Action issued May 31, 2016 in Japanese Patent Application No. 2014-524434 (Submitting English translation only).

*Primary Examiner* — Christopher M Koehler
(74) *Attorney, Agent, or Firm* — Oblon, McClelland, Maier & Neustadt, L.L.P.

(57) ABSTRACT

A method of making a reinforcement for reinforcing a leading edge of a blade, the method including depositing a metal coating on the leading edge by thermal spraying in compression. A blade, for example a blade for a turbine engine, a helicopter, or a propeller, can have the leading edge protected by such a reinforcement.

15 Claims, 2 Drawing Sheets

(51) Int. Cl.
    *F01D 5/14*     (2006.01)
    *F01D 5/28*     (2006.01)
    *F04D 29/02*    (2006.01)
    *F04D 29/32*    (2006.01)
    *B64C 11/20*    (2006.01)
    *C23C 4/02*     (2006.01)
    *C23C 4/08*     (2016.01)
    *C23C 24/04*    (2006.01)
    *C23C 4/067*    (2016.01)
    *C23C 4/01*     (2016.01)

(52) U.S. Cl.
    CPC ............... *C23C 4/02* (2013.01); *C23C 4/067* (2016.01); *C23C 4/08* (2013.01); *C23C 24/04* (2013.01); *F01D 5/147* (2013.01); *F01D 5/288* (2013.01); *F04D 29/023* (2013.01); *F04D 29/324* (2013.01); *F05D 2220/36* (2013.01); *F05D 2230/90* (2013.01); *F05D 2240/303* (2013.01); *F05D 2300/10* (2013.01); *F05D 2300/611* (2013.01); *Y02T 50/672* (2013.01); *Y02T 50/673* (2013.01)

(58) Field of Classification Search
    CPC ......... C23C 24/04; F01D 5/147; F01D 5/288; F04D 29/023; F04D 29/324; F04D 29/38; F05D 2220/36; F05D 2230/90; F05D 2240/303; F05D 2300/10; F05D 2300/611; Y02T 50/672; Y02T 50/673
    See application file for complete search history.

(56) References Cited

U.S. PATENT DOCUMENTS

| | | | | |
|---|---|---|---|---|
| 4,728,262 A | * | 3/1988 | Marshall | B64C 11/205 416/224 |
| 4,944,655 A | * | 7/1990 | Merz | B64C 11/26 416/146 R |
| 5,120,613 A | | 6/1992 | Basler et al. | |
| 5,358,379 A | * | 10/1994 | Pepperman | B23P 6/005 415/191 |
| 7,841,834 B1 | | 11/2010 | Ryznic | |
| 2002/0197152 A1 | | 12/2002 | Jackson et al. | |
| 2003/0039764 A1 | | 2/2003 | Burns et al. | |
| 2005/0207896 A1 | | 9/2005 | Gigliotti, Jr. et al. | |
| 2006/0216429 A1 | | 9/2006 | Bengtsson et al. | |
| 2007/0140859 A1 | * | 6/2007 | Schreiber | F01D 5/141 416/223 R |
| 2009/0324401 A1 | * | 12/2009 | Calla | C23C 30/00 415/200 |
| 2011/0129351 A1 | * | 6/2011 | Das | C23C 24/04 416/241 A |

FOREIGN PATENT DOCUMENTS

| | | |
|---|---|---|
| EP | 2 327 812 A1 | 6/2011 |
| FR | 2 318 312 | 2/1977 |
| JP | 62-113802 A | 5/1987 |
| JP | 62-165506 | 7/1987 |
| JP | 2-230902 A | 9/1990 |
| JP | 4-32546 A | 2/1992 |
| JP | 2005-273015 A | 10/2005 |
| JP | 2011-117446 A | 6/2011 |

* cited by examiner ations (birds, gravel, ice, sand, etc.) to be suitable for use without protection —

METHOD OF MAKING PROTECTIVE REINFORCEMENT FOR THE LEADING EDGE OF A BLADE

FIELD OF THE INVENTION

The invention relates to a method of making protective reinforcement for the leading edge of a blade, and also to a blade protected by such reinforcement. By way of example, the blade may be a blade of a turbine engine, of a helicopter, or of a propeller.

STATE OF THE PRIOR ART

In the field of aviation, and more particularly in the field of airplane turbojets, a constant concern is reducing the weight of the component elements of the turbojet. This concern has led to fan blades or guide blades being developed that are blades made of organic matrix composite material, such composite blades being lighter than metal blades.

Nevertheless, the leading edges of such composite blades are too sensitive to erosion and to potential impacts (birds, gravel, ice, sand, etc.) to be suitable for use without protection. That is why it is known to protect such a leading edge with the help of:

a metal reinforcing strip stuck on the edge;
anti-erosion paint applied to the edge;
an anti-erosion film made of metal or plastics material that is stuck onto the edge; or
a combination of the above-mentioned protections.

Whatever the protection used, its bonding on the leading edge is an aspect that is essential: it is necessary for the protection to bond to the leading edge sufficiently well for it to accommodate impacts without becoming detached and without moving relative to the leading edge, and to meet service life requirements in normal operation.

Although satisfactory, those known protections are found to be too complex and/or too expensive to be used in practice. Furthermore, they do not make it possible to repair a blade (i.e. to ensure that a blade that has been worn or damaged in service and then repaired complies with requirements), or to recover a blade (i.e. to take a blade found defective during fabrication and bring it up to requirements).

There therefore exists a need for a protective reinforcement that is free from the above-mentioned drawbacks, at least in part.

SUMMARY OF THE INVENTION

The invention provides a method of making reinforcement for protecting the leading edge of a blade, wherein the reinforcement is a metal coating deposited on the leading edge by thermal spraying. The reinforcement is thus formed by the deposited metal coating.

The term "metal coating" is used to designate a coating that may be made of pure metal, metal alloy, or cermet. Advantageously, the metal or alloy is sufficiently ductile for the coating to present good impact-damping properties, so as to be effective in protecting the leading edge.

Advantageously, the metal coating is deposited by thermal spraying in compression. The technique of thermal spraying in compression is a known technique consisting in using a high velocity method of thermal spraying (e.g. a "cold spray" method, a high velocity oxygen fuel (HVOF) method, a high velocity air fuel (HVAF) method, hybrid methods, etc.) while setting the spray parameters, in particular the spray velocity of the metal particles, in a manner that is appropriate for ensuring that the deposited coating is "in compression". A coating that is in compression and that has been deposited on a plane and deformable testpiece exerts forces on the testpiece such that the testpiece tends to become convex beside the coating.

By means of thermal spraying in compression, it is possible firstly to deposit a metal coating (i.e. reinforcement) of considerable thickness on the blade, typically having a thickness of several millimeters, and more particularly a thickness lying in the range 0.5 millimeters (mm) to 20 mm. Furthermore, since the deposited coating is in compression, it clamps onto the leading edge of the blade, thereby further improving the bonding of the reinforcement on the edge.

In certain embodiments, prior to the thermal spraying step, at least one longitudinal groove is formed in the blade on either side of the leading edge (i.e. giving a total of at least two grooves), the metal coating being deposited in these grooves. Said grooves are said to be "longitudinal" because they extend in the length direction of the blade, like the leading edge. When the blade is not straight, but rather is twisted, said grooves follow the curvilinear leading edge of the blade, such that they themselves are curvilinear.

Such grooves enable the reinforcement to be embedded in the blade. This embedding further improves retention of the reinforcement on the leading edge, in particular by providing mechanical retention in shear. In other words, the grooves prevent relative sliding between the reinforcement and the blade.

In other embodiments, the grooves are fabricated by machining, after the blade has been fabricated. This machining operation presents the advantage of being simple to perform, but it may lead to a reduction in the mechanical strength of the blade.

In certain embodiments, the grooves are fabricated by molding during fabrication of the blade. Compared with machining, this solution presents the advantage of leading to a smaller reduction in the mechanical strength of the blade.

In certain embodiments, the grooves have a profile that is flared in order to make it easier to deposit the metal coating in the bottoms of the grooves.

In certain embodiments, said metal coating is made of Ni, Al, or Ti, of an alloy based on Ni, Co, Al, or Ti, or of cermet. For example, it may comprise:

an Ni-based alloy of the NiAl, NiCrAl, NiCrAlY type, and in particular an Ni-based alloy having 5% to 20% by weight of Al, e.g. Ni5Al, NiCr-6Al;
an aluminum alloy having at most 12% by weight of Si;
a so-called "strong" metal alloy based on Ni or Co that has a large content of additional metallic elements, e.g. CoMoCrSi, CoNiCrAlY;
a cermet having a large content (preferably greater than 12% by weight) of a metallic element of the Co, Ni, Cu, Al type or of an alloy of these elements, e.g. WC12Co, WC17Co; or
a lightly-alloyed alloy of Ti such as TA6V.

Such metals or alloys present mechanical properties, in particular ductility, that are advantageous for the desired application.

The invention also provides a blade having a leading edge, the leading edge being protected by reinforcement formed by a metal coating deposited on the leading edge by thermal spraying in compression. The reinforcement may also include a bonding underlayer or a foil interposed between the leading edge and the metal coating, as described below.

In certain embodiments, the blade is made of organic matrix composite material. By way of example, it may be a composite blade obtained by draping a woven fabric. Still by way of example, the composite material used may be made up of an assembly of woven carbon and/or plastics fibers with a resin matrix (e.g. a matrix of epoxy resin, of bismaleimide, or of cyanate-ester), the assembly being shaped by molding using a vacuum resin injection method of the resin transfer molding (RTM) type.

In certain embodiments, the blade presents two longitudinal grooves, one on either side of the leading edge, which grooves are filled in by the metal coating. The metal coating (and thus the reinforcement) therefore covers these grooves.

In certain embodiments, said metal coating is made of Ni, Al, or Ti, or of an alloy based on Ni, Co, Al, or Ti.

In certain embodiments, the thickness of the reinforcement lies in the range 0.5 mm to 20 mm.

The above-mentioned characteristics and advantages of the invention, together with others, appear on reading the following detailed description of examples of the invention. The detailed description is made with reference to the accompanying drawings.

BRIEF DESCRIPTION OF THE DRAWINGS

The accompanying drawings are diagrammatic and not to scale, and they seek above all to illustrate the principles of the invention.

In the drawings, from one figure to another, elements (or portions of an element) that are analogous are identified using the same reference sign.

DETAILED DESCRIPTION OF EXAMPLES

Figure 1:
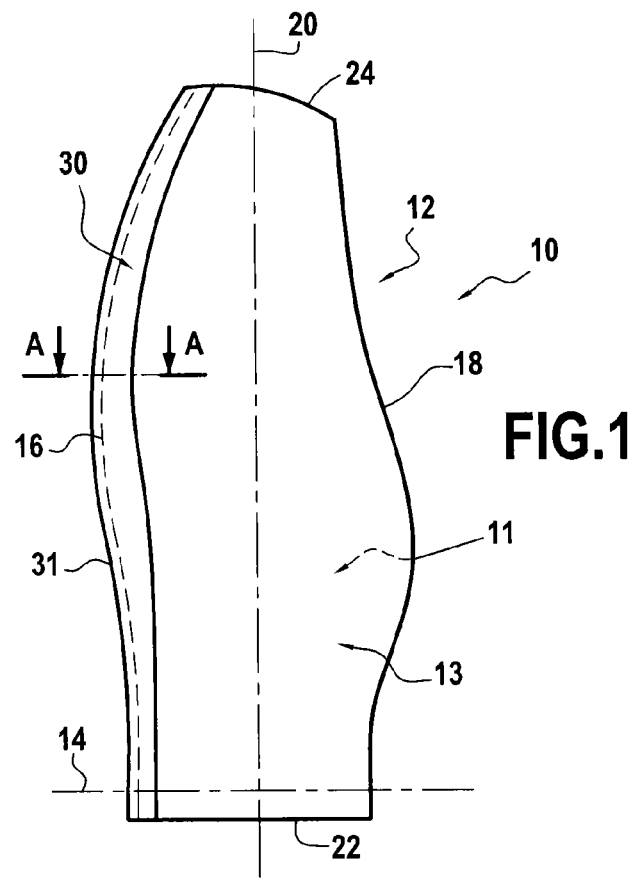
FIG. 1 is a side view of a blade having its leading edge covered by a protective reinforcement.
Figure 2:
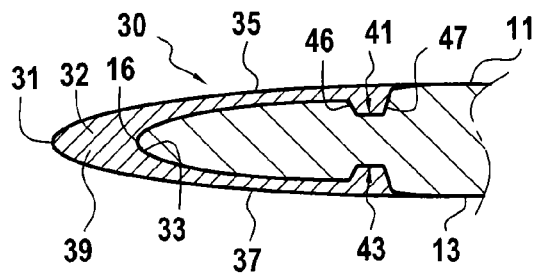
FIG. 2 is a fragmentary view of the FIG. 1 blade in section on cross-section plane A-A.
Figure 3:
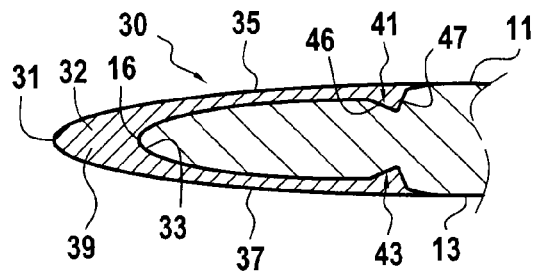
FIG. 3 is a view analogous to that of FIG. 2, showing another example of a blade.
Figure 4:
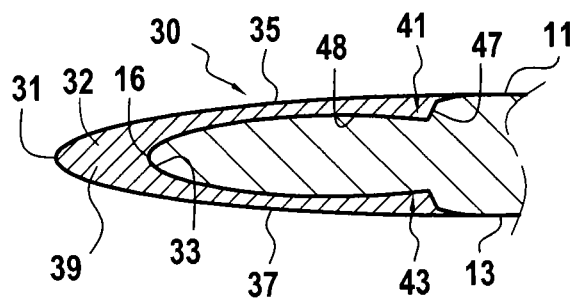
FIG. 4 is a view analogous to that of FIG. 2, showing another example of a blade.
Figure 5:
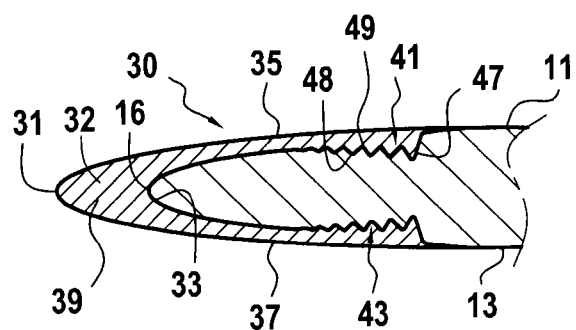
FIG. 5 is a view analogous to that of FIG. 2, showing another example of a blade.

FIGS. 1 and 2 show a blade 12 being a turbine engine blade 10. The blade is a fan blade of an airplane turbojet.

The blade 12 is to be situated in the stream of air passing through the turbojet. Upstream and downstream are defined relative to the normal flow direction of this stream.

The blade 12 has an aerodynamic surface and extends in a first direction 14 that is axial (relative to the axis of rotation of the blade 10) between a leading edge 16 and a trailing edge 18, and in a second direction 20 that is radial (corresponding to the longitudinal direction of the blade 12) between a root 22 and a tip 24. The blade 10 is fastened by its root 22 to a rotary carrier disk that is common to a plurality of blades.

The suction and pressure-side faces 13 and 11 are the side faces of the blade 12 connecting the leading edge 16 to the trailing edge 18.

The leading edge 16 is covered in protective reinforcement 30. The reinforcement 30 fits closely to the shape of the leading edge 16, which it extends so as to form the leading edge 31 of the reinforcement.

The protective reinforcement 30 presents a section that is substantially U-shaped and it is positioned astride the leading edge 16. This reinforcement has a base 39, which is the zone of greatest thickness (e.g. lying in the range 10 mm to 20 mm) of the reinforcement and which defines the leading edge 31 of the reinforcement. The base is extended by two side flanges 35 and 37 situated respectively on the pressure side and on the suction side of the blade 10. In cross-section (FIG. 2), the flanges 35 and 37 present a profile that begins by tapering going towards the trailing edge 18 and that then becomes thicker towards the end portions of the flanges.

The protective reinforcement 30 is made by depositing a metal coating 32 on the leading edge 16 by thermal spraying in compression.

Figure 6:
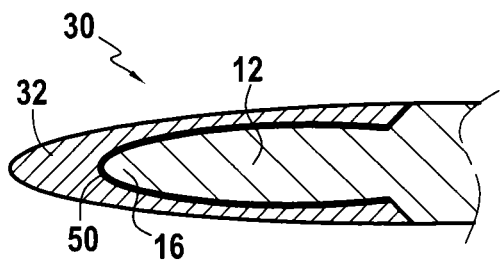
FIG. 6 is a view analogous to that of FIG. 2, showing another example of a blade.

A bonding underlayer 50 (see FIG. 6) may be deposited on the leading edge 16 prior to depositing the metal coating 32. By way of example, this bonding underlayer 50 may be constituted by an alloy of Ni, Al, Cu, and Co in which the content of other elements is small (less than 15% by weight). By way of example, this bonding underlayer is sprayed by plasma spraying or by flame spraying. Once the bonding underlayer 50 has been deposited, the coating 32 is thermally sprayed on this underlayer 50.

The thermal spraying of the bonding underlayer 50 may be performed using low-velocity parameters: flame spraying is intrinsically a low-velocity operation, whereas in plasma spraying, the volume of $Ar+H_2$ gas is selected to be less than or equal to 40 liters per minute (L/min). Furthermore, one or more of the following parameters may be used for the thermal spraying of the underlayer:

underlayer thickness in the range 0.05 mm to 0.25 mm;
workpiece kept as cold as possible (e.g. temperature of the leading edge at a depth of 0.5 mm from the surface being at least 10% lower than the glass transition point of the plastics material);
low powder mass flow rate (e.g. <40 grams per minute (g/min));
vigorous cooling by blowing (or even cryogenic blowing); and
fast travel speed of the spray gun (e.g. 60 meters per minute (m/min) to 120 m/min).

By way of example, the metal coating 32 is made of a material selected from: a nickel-based alloy; a cermet; and a strong metal alloy based on nickel or cobalt. The metal coating 32 is obtained by spraying said material with the help of an HVOF, HVAF, or Cold Spray spray appliance with its parameters set so as to produce a coating in compression.

It is possible to perform a test of HVOF, HAVF, or Cold Spray spraying on an "Almen" testpiece in order to select the best materials for the metal coating 32. The materials used are preferably materials that satisfy the following three criteria:

the deposited coating puts the "Almen" testpiece into compression;
the coating may be deposited up to a thickness of more than 1 mm without separation being observed; and
a thermocouple placed on the back of the testpiece shows that its temperature does not exceed 150° C. during deposition.

Furthermore, the compression level of the coating may be monitored using a so-called "Almen" testpiece (test as specified by the NFL 06-832C standard) for a specified coating thickness, typically 0.5 mm. The value of the Almen arch is preferably greater than F5N.

The thermal spraying of the metal coating 32 in compression may be performed as follows.

By way of example, for cold spray spraying: spray velocity greater than Mach 1;
gas temperatures lying in the range 200° C. to 1000° C.;
powder mass flow rate lying in the range 10 g/min to 80 g/min; and
chamber pressure greater than 40 bars.

For example, for HVOF spraying:
gas: kerosene/oxygen or hydrogen/oxygen;
powder mass flow rate in the range 10 g/min to 80 g/min;
HVOF HP equipment with chamber pressures greater than 8 bars;
cryogenic cooling (liquid $CO_2$ or nitrogen or "pellet" $CO_2$) directly on the coating; and
additional blowing keeping the part below 150° C.

For example, for HVAF spraying:
gas: kerosene/oxygen or hydrogen/oxygen;
powder mass flow rates in the range 10 g/min to 80 g/min;
HVAF HP equipment with chamber pressures greater than 8 bars; and
cryogenic cooling (liquid $CO_2$ or nitrogen or "pellet" $CO_2$) directly on the coating.

Before thermal spraying of the coating 32 or of the underlayer 50, it may be preferable to prepare the surface of the leading edge 16 of the blade 12. By way of example, this occurs when the blade 12 is made of knitted carbon fibers and an injected plastics binder (usually epoxy resin). During knitting, the carbon fibers become imbricated leaving a minimum amount of space. On the surface, this imbrication is interrupted and the injected plastics binder smoothes the residual roughness. In so doing, the leading edge 16 ends up with a higher plastic/fiber ratio on the surface than in its core. The bonding of the coating 32 or of the underlayer is generally better on fibers than on plastics material, so the preparation may consist in mechanically descaling the surface of the leading edge 16 in order to remove excess plastic. This descaling generally does not exceed 0.1 mm to 0.2 mm (providing the blade 12 has been molded correctly).

Figure 7:
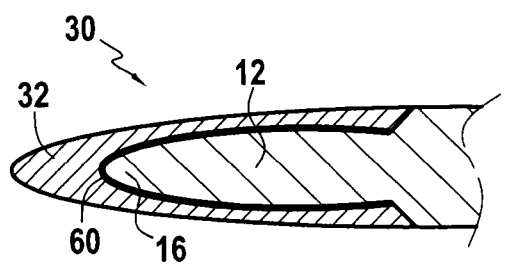
FIG. 7 is a view analogous to that of FIG. 2, showing another example of a blade.

Under certain circumstances, descaling is nevertheless not possible, e.g. because there is a risk of reducing the mechanical strength of the part or zone under consideration (as applies to parts or zones that are heavily loaded mechanically) and/or because the part or zone under consideration is too small to be subjected to a loss of material. Under such circumstances, the bonding underlayer 50 may be replaced by foil 60 of small thickness, e.g. 0.02 mm to 0.4 mm (see FIG. 7). The foil 60 is fastened to the leading edge 16, e.g. by adhesive. The foil may be bonded adhesively during molding of the part or after the part has been molded. The foil 60 may then be perforated by microholes in order to improve adhesive bonding. Once the foil 60 has been bonded, the coating 32 is thermally sprayed onto the foil 60.

The underlayer 50 or the foil 60 may be made of metal, so that spraying of the coating 32 may take place in a configuration for spraying onto a metal substrate.

As shown in FIG. 2, the blade 12 may present respective longitudinal grooves 41, 43 on either side of the leading edge 16 (e.g. a first groove on one side of the leading edge and a second groove on the other side). These two longitudinal grooves 41, 43 are situated respectively in the pressure side 11 and the suction side 13. The metal coating is deposited in these grooves 41, 43 so that the grooves are covered by the reinforcement 30.

The flanges 35, 37 present their greatest thickness in the grooves 41, 43, and their minimum thickness upstream from the grooves. These grooves 41, 43 enable the reinforcement 30 to be embedded in the blade 12.

Various profiles may be envisaged for the grooves 41, 43. FIGS. 2 to 5 show different examples of possible profiles. On their downstream sides (i.e. towards the trailing edge 18), the grooves 41, 43 are defined by respective steps 47 in the side faces of the blade 12, these steps 47 forming abutments for the reinforcement 30 in the event of an impact and thus preventing the reinforcement 30 from sliding on the blade 12. On their upstream sides (i.e. towards the leading edge 16), the grooves 41, 43 are defined by respective steps in the side faces of the blade 12, as in the examples of FIGS. 2 and 3, or on the contrary they are defined by respective gentle slopes 48, as in the example of FIG. 4. The example of FIG. 5 differs from that of FIG. 4 in that a series of longitudinal corrugations 48 are formed in the gentle slopes 48 on the upstream sides of the grooves 41, 43.

In all of these examples, the grooves 41, 43 present a profile that is flared so that the metal coating can be deposited easily on the bottoms of the grooves, even when the thermal spraying is at an angle that is not 90° (which corresponds to spraying orthogonally relative to the surface). Typically, the groove profiles shown make it possible to perform spraying at an angle lying in the range 45° to 90°.

The embodiments or examples described in the present description are given by way of non-limiting illustration, and in the light of this description the person skilled in the art can easily modify the embodiments or examples or can envisage others, while remaining within the scope of the invention.

Furthermore, the various characteristics of these embodiments or examples may be used on their own or in combination with one another. When they are combined, these characteristics may be combined as described above or in other ways, the invention not being limited to the specific combinations described in the present description. In particular, unless specified to the contrary, a characteristic described in relation with any one embodiment or example may be applied in analogous manner with other embodiments or examples.

The invention claimed is:

1. A method of making a reinforcement for protecting a blade comprising a leading edge, a trailing edge and two side faces, the method comprising:
    depositing a metal coating on the leading edge by thermal spraying in compression so as to form a reinforcement in compression, and
    prior to the thermal spraying in compression, forming at least one longitudinal groove in the blade on either side of the leading edge, with the metal coating being deposited in the grooves, the reinforcement being U-shaped and including a base extended by two side flanges situated respectively on each side face, each side flange presenting a profile that begins by tapering going towards the trailing edge and becomes thicker towards an end portion of the flange, the flanges presenting a first thickness in the grooves and a second thickness upstream from the grooves, the first thickness being larger than the second thickness.

2. The method according to claim 1, wherein the metal coating is made of Ni, Al, or Ti, or of an alloy based on Ni, Co, Al, or Ti, or of cermet.

3. The method according to claim 1, wherein the reinforcement has a thickness in a range of 0.5 mm to 20 mm.

4. The method according to claim 1, further comprising depositing a bonding underlayer on the leading edge prior to the depositing of the metal coating.

5. The method according to claim 1, further comprising fastening a metal foil onto the leading edge prior to the depositing of the metal coating.

6. The method according to claim 1, wherein on a downstream side, each groove is defined by a step in each side face of the airfoil, the steps forming abutments for the reinforcement in an event of an impact and thus preventing the reinforcement from sliding on the airfoil.

7. The method according to claim 1, wherein the blade further comprises a root and a tip, and the longitudinal groove extends in a length direction of the blade between the root and the tip.

8. The method according to claim 7, wherein the groove follows a shape of the leading edge.

9. A blade comprising:
a leading edge, the leading edge being protected by a reinforcement formed by a metal coating deposited on the leading edge by thermal spraying in compression;
a trailing edge;
two side faces; and
at least one longitudinal groove on either side of the leading edge, the grooves being filled with the metal coating,
wherein the reinforcement is U-shaped and includes a base extended by two side flanges situated respectively on each side face, each side flange presenting a profile that begins by tapering going towards the trailing edge and becomes thicker towards an end portion of the flange, the flanges presenting a first thickness in the grooves and a second thickness upstream from the grooves, the first thickness being larger than the second thickness.

10. The blade according to claim 9, the blade being made of organic matrix composite material.

11. The blade according to claim 10, the blade being a blade of a turbine engine, a helicopter, or a propeller.

12. The blade according to claim 9, wherein the metal coating is made of Ni, Al, or Ti, or of an alloy based on Ni, Co, Al, or Ti, or of cermet.

13. The blade according to claim 9, wherein the reinforcement has a thickness in a range of 0.5 mm to 20 mm.

14. The blade according to claim 9, wherein the blade further comprises a root and a tip, and the longitudinal groove extends in a length direction of the blade between the root and the tip.

15. The method according to claim 14, wherein the groove follows a shape of the leading edge.

* * * * *